United States Patent Office 3,363,584
Patented Jan. 16, 1968

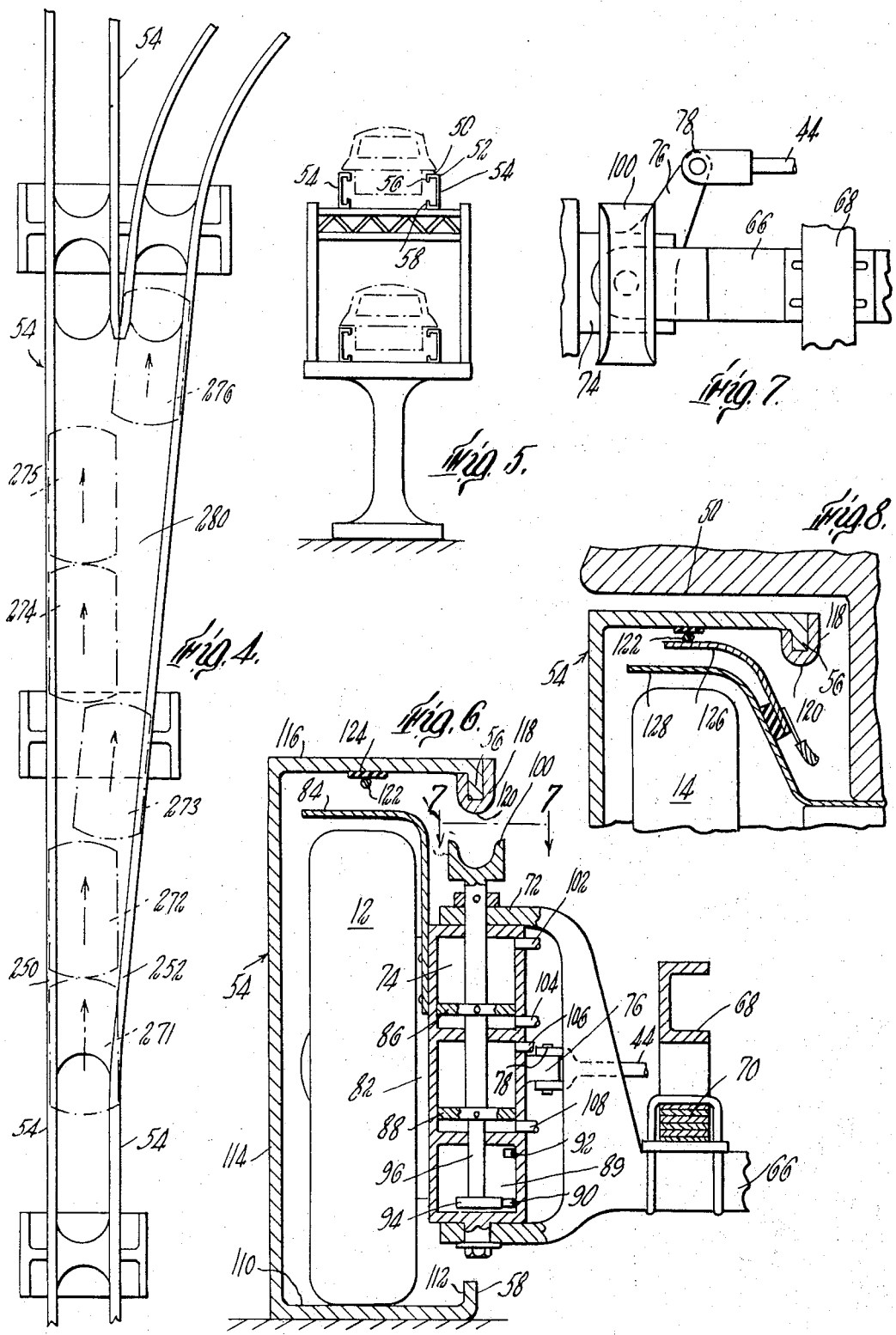

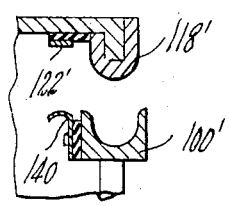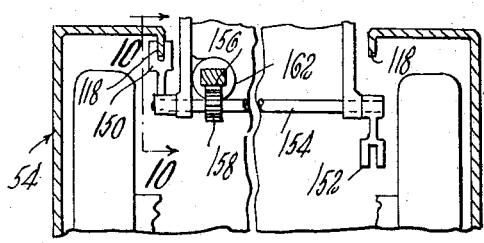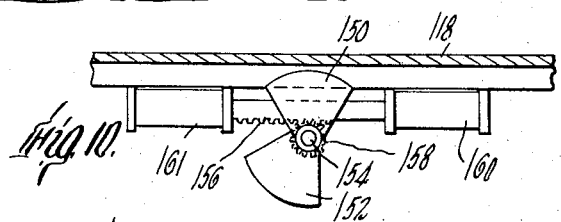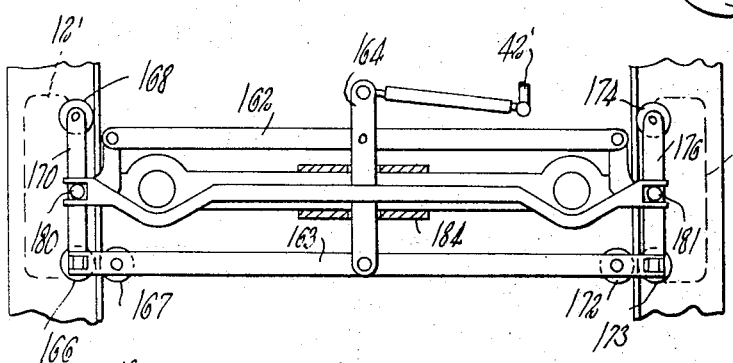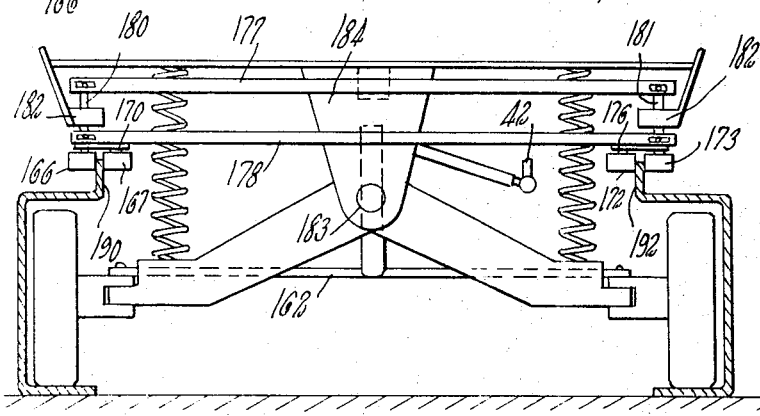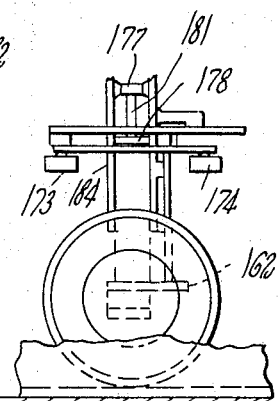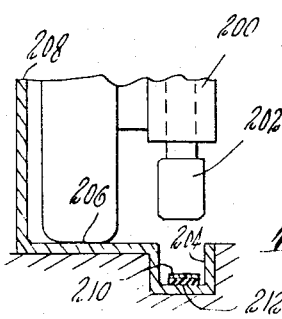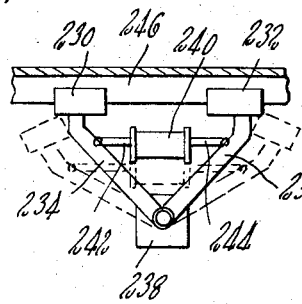

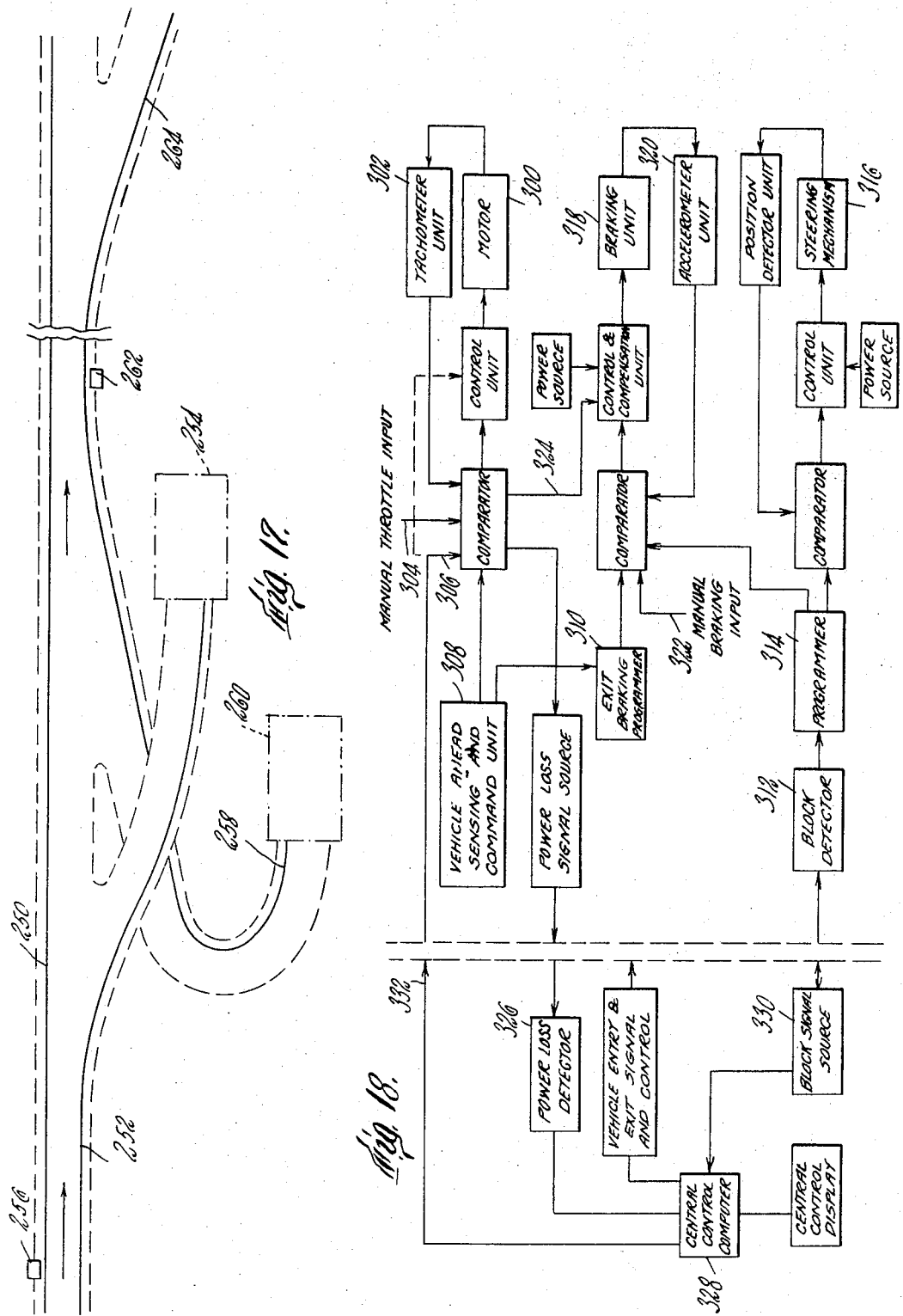

3,363,584
VEHICLE CONTROL MECHANISMS
Stephen G. Brush, Woodstock Valley, Conn., and William L. Alden, Westboro, Mass., assignors to Alden Self-Transit Systems Corporation, Westboro, Mass., a corporation of Massachusetts
Continuation of application Ser. No. 216,451, Aug. 13, 1962. This application July 23, 1964, Ser. No. 384,713
7 Claims. (Cl. 104—247)

This application is a continuation of our co-pending application Ser. No. 216,451, filed Aug. 13, 1962, now abandoned.

This invention relates to transportation systems and to vehicles particularly useful on such systems.

There is currently considerable concern as to the adequacy of the present type of mass transportation systems. Neither conventional rail nor automobile systems appear to offer adequate solutions to the problems of increasing congestion and the desired mobility of the vehicles. An improved transportation system in which privately controlled vehicles may be integrated into an automatically controlled mass transportation system is disclosed in the copending application, Ser. No. 159,930, now abandoned, entitled Transportation Apparatus, filed Dec. 18, 1961, in the name of William L. Alden et al., and assigned to the same assignee as this application, and this invention is directed to improvements in transportation systems of that general nature.

A principal object of the invention is to provide a new and improved transportation system.

Another object of the invention is to provide improved vehicle control mechanisms useful in vehicles which may be employed both in local transportation situations and in a system which integrates private or individually controlled vehicles into a high density, automatically controlled mass transportation system.

A further object of this invention is to provide a novel and improved vehicle steering control mechanism useful for controlling vehicles in a transportation system.

Still another object of the invention is to provide a new and improved form of automatic vehicle steering control which is easily accommodated into a vehicle that may be manually controlled in a conventional manner.

The transportation system in accordance with principles of the invention employs a track which defines the vehicle path along which the vehicle is to travel while providing support for the vehicle which is in driving engagement therewith. Two guide structures are employed along the length of the track, at least one being present at all times throughout the length of the track and two guide structures being concurrently employed at switching (entry or exit, for example) junctions. The vehicle constructed in accordance with principles of the invention includes two guide followers or sensers, each being responsive to one of the guide structures. Each guide follower is coupled to the vehicle steering mechanism. The two guide followers are selectively actuated to control the vehicle steering in response to the position of the guide structure to which the actuated guide follower is responsive. When the vehicle is off the track or controlled roadway, a passenger may steer the vehicle and control the propulsion. At the time the vehicle enters the controlled roadway system the guide followers are actuated, preferably in an automatic manner, to control the direction of travel of the vehicle along the track. In the preferred embodiment of the invention control power and signals supplied to the vehicle from the system to automatically control the movement of the vehicles along the system and to actuate the guide followers to control the direction of travel along the system. The system enables the assembly of vehicles into train configuration and the control and switching out of such configuration in improved manner. The application of system control power to the vehicle when the vehicle enters the system may disengage or disable the manual control facilities of the vehicle, for example in an automatic manner, so that system coordinated directional control and movement of the vehicle along the system is provided without the need of manual supervision.

Other objects, features and advantages of the invention will be seen as the following description of preferred embodiments thereof progresses, in conjunction with the drawings, in which:

FIG. 4 is a top view of a section of a track of a transportation system constructed in accordance with principles of the invention in which vehicles moving there-along are shown in diagrammatic form;

FIG. 5 is an elevational view showing a two level transportation system constructed in accordance with principles of the invention;

FIG. 6 is a detailed view of one embodiment of a vehicle steering control structure constructed in accordance with principles of the invention;

FIG. 7 is a top view of the steering control structure associated with one of the front wheels taken along the line 7—7 of FIG. 6;

FIG. 8 is a diagrammatic view of one form of control power input to the vehicle from the transportation system as employed with the steering control structure shown in FIGS. 6 and 7;

FIGS. 9–11 are an end view, side view and top view respectively of a modified embodiment of a guide structure and cooperating steering control structure constructed in accordance with principles of the invention;

FIGS. 12–14 are side view, top view and front view of another embodiment of steering control apparatus;

FIGS. 15 and 16 are diagrammatic illustrations of the construction of still other forms of control structure;

FIG. 17 is a diagram of a track system illustrating features of the invention; and FIG. 18 is a block diagram of a control system employed in a transportation system constructed in accordance with the invention.

Figure 1:
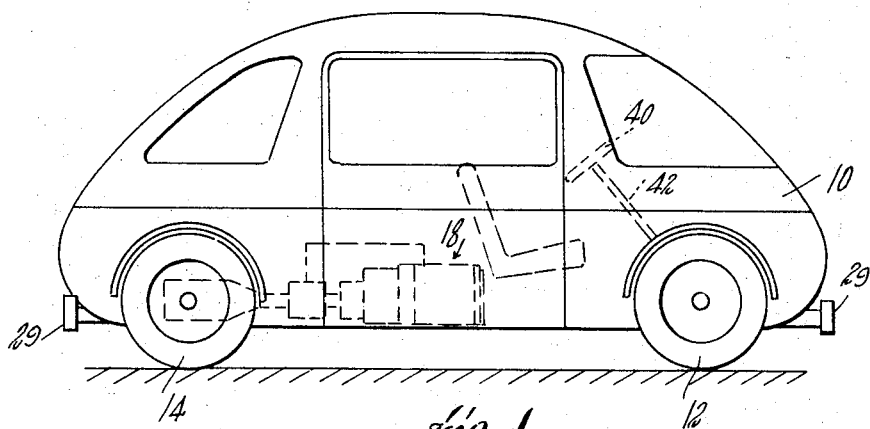
FIG. 1 is a side view of a vehicle constructed in accordance with principles of the invention showing the general configuration of the vehicle and location of drive components therein.
Figure 2:
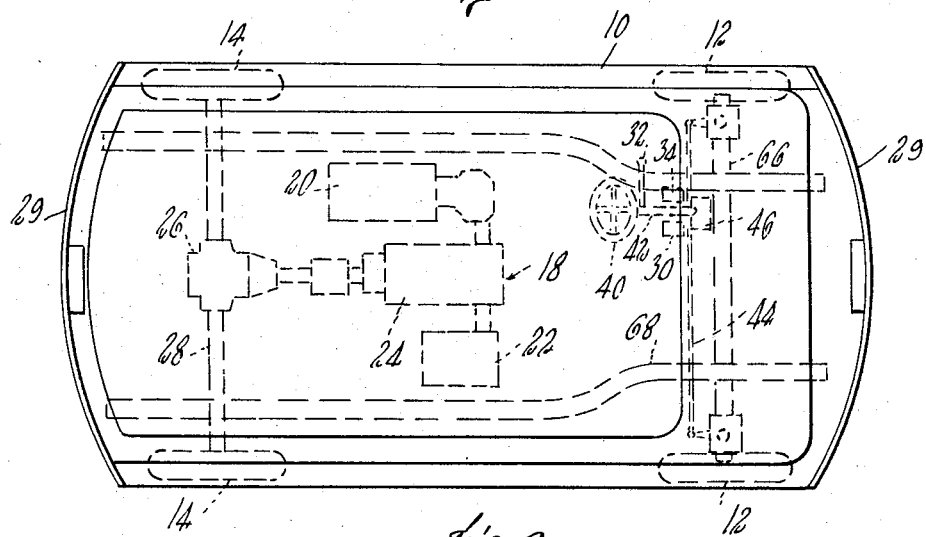
FIG. 2 is a top view of the vehicle shown in FIG. 1.
Figure 3:
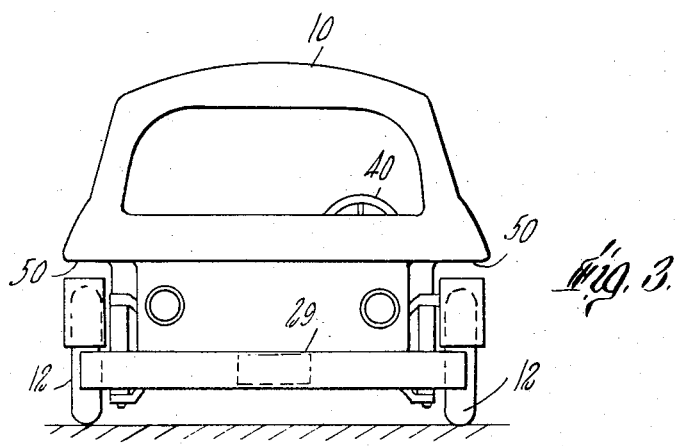
FIG. 3 is a front view of the vehicle shown in FIG. 1.

With reference to the vehicle shown in FIGS. 1–3, the vehicle is of generally conventional configuration and has a body 10 and four foam filled, rubber tired road wheels 12, 14 which are arranged in the usual rectangular configuration, the front wheels 12 being steerable and the rear wheels 14 being driven by the motor drive system 18. That system drive includes an internal combustion engine 20 and an electric motor 22 which may be selectively coupled in suitable manner, as through a transmission 24 and differential 26 to axle 28, to drive the rear wheels 14. In an alternative arrangement the vehicle may be driven by a single source, for example an internal combustion engine, which is operative under conventional manual control when the vehicle is off the track system and under automatic control from control power supplied by a suitable connection when it is on the track system. The vehicle, as illustrated, is designed to seat three passengers abreast, and includes two doors and conventional auxiliary equipment such as headlights, windshield wipers, bumpers, etc. Shock type bumpers 29 are employed on the vehicle and they house magnets which are selectively energized or positioned for control of trains of vehicles as hereinafter described.

The vehicle controls include accelerator control 30, forward-reverse control 32 and brake control 34. A steering wheel 40, which may be of conventional type, is coupled by shaft 42 through steering linkage 44 to control the position of the front wheels 12. Preferably, the steering arrangement includes a clutch 46 which acts as an interlock and disables the manual steering system in response to system power when the vehicle is on the rail system.

The lower portion of the body 10 of the vehicle is formed in recessed configuration adjacent the wheels and provides a channel 50 (FIG. 3) which receives a flange portion 52 of the guide track 54 as shown in FIGS. 5 and 6. This guide track has two identical track elements, one of which receives the left wheels and the other receiving the right wheels. Each track element is C-shaped in cross-section and has a depending member 56 which supports a guide member, and an upstanding edge 58 which provides supplementary guiding.

As best indicated in FIGS. 6 and 7, each front wheel 12 is supported on an axle 66 which may be secured to the vehicle frame 68 by suitable resilient means such as leaf spring 70. The end 72 of the axle is formed to receive a kingpin arrangement including a "cylinder" 74. Each cylinder is connected by means of arm 76 and coupling 78 to the vehicle steering linkage 44. The cylinders are mounted on a brake drum structure or other suitable element 82 for rotation about a vertical axis of sufficient magnitude to provide proper control of the vehicle's direction. Also secured to the cylinder supporting structure 82 is a mud guard structure 84. The kingpin element 74 has a channel of square or oval cross-section for example which is constructed in a twin double acting hydraulic cylinder mechanism. Two piston elements 86, 88 each of corresponding cross-section are mounted therein. In the lower portion of the mechanism a sealed fluid free chamber 89 is formed, in which is mounted a pair of electrical contacts 90, 92 which cooperate with a slide switch element 94 secured on the piston rod 96. The engagement of element 94 with contacts 90 or 92 complete an electrical circuit that provides a positive indication of the position of the piston rod 96 and the guide channel 100 that is secured at the upper end of the piston rod. The upper cylinder section has fluid ports 102, 104 and the lower cylinder section has fluid ports 106, 108. Fluid is admitted to two hydraulic chambers in each mechanism in parallel so that continuity of control is assured even though one hydraulic circuit fails.

A cross section of the track is shown in FIG. 6 adjacent the front wheel 12. The channel has a drive surface 110 on which the tire of the vehicle runs, a relatively short inner wall 112 (part of the lower edge flange 58) and an upstanding outer wall 114 having a horizontal flange 116 which terminates in a depending edge member 56 on which is secured the smoothly rounded guide rail structure 118. The rail 118 has a guide surface configuration 120 with which the guide channel 100 mates for guiding purposes. Also mounted on the lower surface of the horizontal flange 116 of the track channel is an electrical conductor 122 spaced from the track channel by suitable electrical insulation 124.

A top view of the structure is shown in FIG. 7. As there indicated the guide channel 100 is an elongated member so that it contacts the guide rail 118 along a substantial length. The guide channel is directly coupled to the wheel 12 through the square piston kingpin assembly, and thus when it is in engagement with the guide rail there is positive steering control of the vehicle by the system.

A system for coupling power to the vehicle is shown in FIG. 8. A conductor 126 supported in insulated relation from the rear mud guard 128 inside body channel 50 is carried in sliding or wiping engagement with the system conductor 122. This conductor 126 receives power from conductor 122 and applies it to circuitry within the vehicle for controlling the movement of the vehicle along the track system. In a slightly modified embodiment of the guide and power conductor, shown in FIG. 9, a spring loaded pick up shoe 140 carried by the vehicle is mounted directly on the guide channel 100' and engages power conductor 122' which is located in insulated relation immediately adjacent the depending guide rail 118'.

Still another configuration of guide structure is shown in FIGS. 10 and 11 in which two guide channels in the form of sectors 150, 152 are mounted on a laterally extending shaft 154. The sectors 150, 152 are on opposite sides of the vehicle as indicated in FIG. 10 and each is connected through the steering linkage to the front wheels 12. In the position shown the sector on the right side of the car is in engagement with the guide rail 118. By rotation of shaft 154 in the counter-clockwise direction approximately 150° the right sector 150 will be disengaged from the associated rail and the left sector 152 will be disposed in position for engagement with the cooperating rail. Rotation of shaft 154 is controlled by a rack and pinion drive 156, 158 cooperating with the shaft 154 and driven by two cylinders 160, 161.

A third embodiment of a system controlled steering mechanism is shown in FIGS. 12–14. In this embodiment as in the others the system steering control mechanism may be interlocked with the manually controlled steering linkage which is coupled to the main steering linkage 162 by means of pivotally mounted cross bar 163 and link 164. Also connected to the main steering linkage are two sets of three rollers 166–168 mounted on link 170 and rollers 172–174 mounted on link 176. Each set of rollers includes a laterally spaced pair of rollers mounted at the forward end of the link and a rear guide roller. These sets of rollers are mounted for vertical movement on a parallelogram arrangement having horizontal members 177, 178 and vertical members 180, 181 which slide in guides 182 secured to the vehicle frame. This parallelogram arrangement is mounted for tilting movement about the shaft 183 and is supported by flanges 184. Suitable mechanical or hydraulic control will tilt the structure so that the set of rollers 166–168 or the set of rollers 172–174 will clear the upstanding guide rail flanges 190 or 192 on the track channel (corresponding to the guide rail 118 in the embodiments shown in FIGS. 6–11. In the same manner the track channels have a running surface which supports the vehicle. As in the case of the other types of channel the vertical outside wall of the track channel provides additional guiding and safety hubs may be employed which contact the vertical wall if the guiding structure fails. The wheels of the car thus are totally enclosed. The track structure further includes a portion extending over the top of the vehicle wheels which assures complete control of the vehicle.

In the operation of this steering mechanism, both sets of rollers normally engage guide flanges 190, 192. If the car is to be switched to the right, the parallelogram structure (links 177, 178, 180, 181) is tilted so that the left guide structure (rolls 172, 173, 174) are rotated up away from the guide rail 192 and the right guide structure (rolls 166, 167, 168) move down along the guide rail 190. (At the switch area the guide surface of the right rail is lower in height.) As the right guide rail 190 curves away from the left guide rail 192, the guide unit follows it and moves the steering link 613, which movement is coupled by link 164 to the rear or main steering link bar 162 which acts on the bell cranks to rotate the front wheels 12'. The curvature of the guide rail is thus coupled directly to the steerable wheels so that control of the vehicle's direction is provided automatically.

A modified form of system steering structure is shown in FIG. 15. This structure employs a kingpin "cylinder" 200 similar to that shown in FIGS. 6 and 7 with the guide channel 202 disposed below rather than above the cylinder. In this embodiment the guide rail 204 is recessed member mounted just inside of the track surface 206. A vertical flange 208 provides supplemental guiding and protection. (An alternative arrangement employs an upstanding guide flange just outside the track surface and a cooperating vehicle carried steering linkage.) In a manner similar to the embodiments of FIGS. 6–11 only the left steering channel or the right steering channel is in engagement with a guide rail 204 at any one time, the two steering channels being interlocked to avoid simultaneous engagement except for transitional instants. An electrical conductor 210 may be mounted in an insulated recess 212 adjacent the guide rail 204 and a contact in the form of a wiper, carried by the vehicle adjacent the rear wheel structure, for example, engages this conductor to transfer system power to the vehicle.

Still other guide surface configurations useful in transportation systems will occur to those skilled in the art. For example, two spaced shoes 230–232, FIG. 16, mounted on linkages 234, 236 and pivotally secured to the steering structure 238 may be utilized in cooperation with a guide rail system. These steering shoes are aligned with one another in a position controlled by a hydraulic cylinder 240 mounted for free vertical movement. The cylinder 240 has piston rods 242, 244 coupled to links 234, 236. In the position shown in FIG. 16 the two shoes 230, 232 engage a guide rail 245 to provide steering control for the vehicle. With the hydraulic cylinder energized the links 234, 236 are rotated to the dotted line position so that the shoes 230, 232 are disengaged from the guide rail 244. In some transportation systems adequate steering control may be obtained through the sensing of the position of the guide structure, by electronic means, for example, rather than by the physical contact with a guide rail.

An illustrative layout of the guide rails at an entrance and exit spur on a section of the main line is shown in FIG. 17 and a detailed view of the exit spur is shown in FIG. 4. The vehicles travel along the main line in the direction indicated by the arrows and normally have their left guide channel in engagement with the left guide rail 250. (The vehicle support track is indicated in dotted lines.) The right guide rail 252 branches off the main line into a discharge area 254 at which area the vehicles are removed from the system control and can be driven manually. As a vehicle moves along the main line it encounters a block signal 256 which may cause preprogrammed circuits to switch control from the left rail 250 to the right rail 252. The guide rail contact then automatically steers the car from the main line into the exit area.

Adjacent the exit spur is an entrance spur guide rail 258 starting from an entrance area generally indicated as 260 and passing under the exit spur. Rail 258 approaches the main line in a generally tangential direction so that a vehicle may enter the main line at full speed. Once it is on the system a suitable indicator, such as cam block 262, is sensed and control is automatically transferred from the entrance guide rail 258 by disengagement of the vehicle carried right guide channel and engagement of the left guide channel with rail 250 for movement along the main line. (Should there be a mechanical malfunction of some type so that switching from the right guide channel to the left guide channel is not accomplished or full speed is not achieved for example, an auxiliary spur 264 may be provided by which the vehicle is removed from the transportation system.) Other forms of guidance may be employed as desired to provide the necessary control. For example, rather than a single main line rail being utilized, in this case the left rail 250 with entrance and exit from space to the right, facility for switching off and on the main line from either side may be achieved with a somewhat more complex control system. In such a system the selection of the guide channel would be automatically controlled by a suitable programmer to permit the vehicle to stay on the main line as long as desired.

A more detailed view of the track structure at the exit spur is shown in FIG. 4 with a train of vehicles 271–276 moving along the main line. Along the main line, as indicated at the upper and lower portions of FIG. 4, the two guide tracks 54 are spaced from one another and are provided with a relatively short upstanding inner flange 58. In the vicinity of the exit spur the upstanding flanges 58 are omitted and the track drive surface 110 is extended across the entire width of the track in a flat plate configuration 280 to provide support for the vehicle across the transition. While a train is proceeding as indicated in FIG. 4 the spacing of the cars (shown in contact with one another) is controlled by suitable sensing devices (for example, infra red sensors, photoelectric devices, or magnetic sensors) so that in the unit vehicles run in closely adjacent configuration. Where magnetic elements in shock type bumpers are employed the cars may be magnetically coupled into trains. Individual cars, however, may be switched out of the "train" as desired without reduction of speed or the necessity for any mechanical movement of the rail system. In this case the lead car 276 and the fourth car 273 are leaving on the exit spur. In order to accomplish this all that is required is that on the detection of a programmed exit request (as from cam block 256—FIG. 17) the right control channel be engaged at a point prior to the exit spur and the left channel be disengaged. (This transfer actuation preferably is interlocked in the system to prevent any change in the guiding channels unless guide rails on both sides of the track are present. Usually such a transfer can occur only at predetermined locations along the track system.) The magnetic couplers are actuated to repel the cars immediately in front and immediately behind the car to be switched out. When this transfer does occur there is little or no change in vehicle speed but the vehicles that are to exit will be guided by the right rail rather than the left rail and they will be automatically extracted from the "train" without any reduction in the speed of the rest of the cars along the main line. As each car enters the exit spur, however, the control power is adjusted to decelerate the car at a reasonable rate as the vehicle approaches the terminal area 254 at which point the vehicles are stopped and the transfer to manual control is made.

FIG. 5 illustrates the use of this transportation system in an arrangement where the two track systems are superimposed so that vehicles moving in one direction are on the upper level and vehicles moving in the opposite direction are on the lower level. If desired the system may operate at ground level.

A block diagram of a typical control system to be associated with these concepts is shown in FIG. 18. This figure depicts vehicle-borne equipment, and stationary equipment required in this particular version for overall control of traffic.

Prime driving power is provided by a servo-controlled motor 300, which may be either of the electrical or internal combustion type. The motor control is a speed servo using tachometric feed-back 302. Provision is indicated for operation of this motor system either by command from a manually operated throttle 304 for use off the rail system or by command from the rail system through the third rail over line 306. During operation on the rail system the speed control servo is also subjected to an input from a "Vehicle Ahead Sensing and Command System" 308. This latter unit exists for safety reasons to provide indications of other vehicles ahead in terms of relative range and/or relative range rate, and may be implemented by use of cooperative radio frequency beacons or photocells operative in the near visible or visible spectrum ranges or similar devices as indicated above. This system may also be used in conjunction with exit spur energy sources and a vehicle borne programmer 310 to assure proper speed reduction prior to exit from the track system.

The steering mechanisms previously discussed are also operated in a servo-controlled manner—in this case, by either an on-off or an on-off-neutral position type. Basic power for steering mechanism operation may be electrical, hydraulic or pneumatic. Also indicated are a car-mounted detector 312 and programmer 314 to allow recognition of, and automatic switching at, pre-chosen exits. Exit recognition signals may be coded or as shown in this version may simply consist of a sum of block signals, each block being a relatively short section of guide track. In this application, a predetermined number of blocks corresponding to the desired routing may be set into the programmer, and travel over the last of the predetermined number initiates the automatic switching of the steering mechanism servo 316.

Braking action required in the operation of the vehicle is shown in the diagram to be provided by a servo-controlled braking unit 318 with longitudinal acceleration feedback 320. As indicated this braking system can be operated manually (line 322) when off the rail system and has inputs from the steering system programmer 314 and from the Vehicle Ahead Sensing and Command unit 308.

Also indicated as vehicle-borne equipment in FIG. 18 is a signal from the drive motor comparator which, in the event of abnormal operation, provides a signal over line 324 to initiate actuation of mechanical lock pin structures associated with the guide channel control mechanism to preclude occurrence of switching under these circumstances. Also shown is a signal from the same comparator in the event of complete loss of power which, by means of perhaps an inertia or gravity operated signal source provides evidence through the Power Loss Detector 326 to the stationary equipment 328 of such a power failure.

In this particular implementation overall traffic control is exercised by a Central Control Computer 328 which obtains information concerning car positions and average speeds through the Block Signal Source 330 and information on power failures through the Power Loss Detector 326. In turn the computer controls power and/or signals to the third rail 332 and provides information for signalling and control of vehicle entry and exit at the separate entrances and exits.

For simplicity, the switching required to accomplish such functions as declutching the steering wheel, removing manual throttle and braking inputs, etc. as desired for safety, is not shown in this diagram.

While preferred embodiments of the invention have been shown and described, additional modifications thereof will be obvious to those skilled in the art. Also, it will be appreciated that while the invention has particular advantages in a mass transportation system, the invention also has application in other systems, for example in toys or amusement games. Therefore, it is not intended that the invention be limited to the disclosed embodiments or to details thereof and departures may be made therefrom within the spirit and scope of the invention as defined in the claims.

We claim:
1. A transportation system comprising a drive surface,
a control rail on each side of said drive surface, said control rails being fixed in position and diverging from one another at a junction,
a vehicle having a steering mechanism and means for propelling said vehicle along said drive surface,
a guide follower mechanism coupled to said steering mechanism including two guide followers, one on each side of said vehicle adapted to cooperate with a correspondingly positioned control rail,
each said guide follower being vertically reciprocable between a first position in engagement with the associated control rail and a second position out of engagement with the associated control rail,
means to actuate said guide followers for engaging said control rails so that at least one of said guide followers in engagement with the cooperating control rail while said vehicle is on said drive surface, and means for providing a signal indicative of the position of the guide follower mechanism and whether each said guide follower is in operative or inoperative position.

2. A transportation system comprising a track defining a vehicle path and providing a support for a vehicle as it moves therealong,
said track including a main portion and a spur portion,
at least two fixed guide structures,
said guide structures being disposed on opposite sides of said track where said main and spur portions join,
each said guide structure extending a predetermined length along said track for providing directional guidance to a vehicle as it moves along the track,
and a vehicle for controlled movement along said track, said vehicle including two steerable wheels,
a steering linkage coupling said steerable wheels together,
two guide followers,
each said guide follower being movable into and out of engagement with the corresponding guide structure so that each guide structure provides, through said steering linkage, positive positioning of said steerable wheels when the cooperating guide follower mechanism is engaged therewith,
means to selectively actuate said guide followers to control the position of said steerable wheels as the vehicle moves along said track in response to the position of the guide structure to which the actuated guide follower is responsive,
with at least one of said guide followers in engagement with the associated guide structure at all times while said vehicle is on said track and only one of said guide followers in engagement with its associated guide structure and the other guide follower completely disengaged from its associated guide structure during intervals of switching between the main and spur portions, and
electrical means operated by said guide follower actuator mechanism for providing a signal indicative of whether each said guide follower is in operative position or in inoperative position.

3. In a vehicle, a control mechanism comprising a steerable road wheel, pivotable about a substantially vertically extending axis,
guide follower means carried by said vehicle and coupled to said wheel for rotation about said axis,
means to shift said guide follower means between a first position disengaged from a guiding element and a second position in engagement with the guiding element for controlling the steering of said vehicle along a path,
and signal coupling means for producing a signal indicative of the position that said guide follower means is in, said signal indicating whether said guide follower means is in operative position or in inoperative position.

4. A transportation system having a vehicle support surface of indeterminate length,
two mechanical guide structures extending along said support surface parallel thereto,
said guide structures diverging from one another at a junction,
each said guide structure having a downwardly facing guide surface, and a vehicle for use on said system including two steerable road wheels, each said steerable wheel being mounted for pivoting about a substantially vertical axis and said steerable wheels being mechanically connected together,
independent follower means carried by said vehicle and coupled to each said steerable wheel and mounted for rotation about said axis,
each said follower means having a surface adapted to mate with said downwardly facing surface of the corresponding guide structure,
hydraulic means to shift each said follower means between a first position in which the follower means is in engagement with one of said guide structures and a second position in which the follower means is out of engagement with said one guide means, each said follower means controlling the steering of said road wheels as a function of the position of the engaged guide structure, and means to signal the position of both of said follower means, said means to signal indicating whether each said follower means is in operative position or in inoperative position.

5. The transportation system as claimed in claim 4 wherein said hydraulic means includes a cylinder directly coupled to a steerable wheel and mounted for rotation about said axis, a piston mounted for reciprocation within said cylinder, means coupling said piston to said follower means, and means coupling angular movement of said piston under the influence of said follower means to said cylinder to steer said steerable wheel.

6. A transportation system comprising two fixed mechanical guide structures of indeterminate length extending parallel to one another, each said guide structure including, at least in part, a generally horizontal vehicle support surface and a generally vertical vehicle stabilizing structure, said guide structures diverging from one another at a junction, each said guide structure having a downwardly facing guide surface and power supply means extending along said system within one of said mechanical guide structures, and a vehicle for use on said system including a plurality of road wheels, two of which are steerable, each said steerable wheel being mounted for pivoting about a substantially vertical axis and said steerable wheels being mechanically connected together, means carried by said vehicle for coupling energy from said power supply means to control the application of propulsion power to a road wheel, independent follower means carried by said vehicle and coupled to each said steerable wheel and mounted for rotation about said axis, each said follower means having a surface adapted to mate with said downwardly facing surface of the corresponding guide structure, hydraulic means to shift each of said follower means between a first position in which the follower means is in engagement with one of said guide structures and a second position in which the follower means is out of engagement with said one guide means, each said follower means controlling the steering of said road wheels as a function of the position of the engaged guide structure, and means to signal the position of both of said follower means, said means to signal indicating whether each said follower means is in operative position or in inoperative position.

7. A vehicle for use with a transportation system having a drive surface, and a control rail on each side of said drive surface, said control rails being fixed in position and divergent from one another at a junction, said vehicle comprising a steering mechanism, means for propelling said vehicle along the drive surface, a guide follower mechanism coupled to said steering mechanism including two guide followers, one on each side of said vehicle, each said guide follower being adapted to cooperate with a correspondingly positioned control rail when said vehicle is on the drive surface, each said guide follower being vertically reciprocable between a first position in which said guide follower is in engagement with the associated control rail when the vehicle is on the drive surface and a second position in which the guide follower is out of engagement with the associated control rail when the vehicle is on the drive surface, means to actuate said guide followers for engaging said control rails so that at least one of said guide followers is in engagement with the cooperating control rail while said vehicle is on the drive surface, and means for providing a signal indicative of said guide follower mechanism, said signal indicating whether each said guide follower is in said first position or in said second position.

References Cited

UNITED STATES PATENTS

| | | | |
|---|---|---|---|
| 3,225,704 | 12/1965 | Gilvar et al. | 104—121 |
| 3,254,608 | 6/1966 | Alden | 104—149 |

ARTHUR L. LA POINT, *Primary Examiner.*

D. E. HOFFMAN, *Assistant Examiner.*